Aug. 3, 1926.
G. M. LUDLOW
1,594,536
MOTION TRANSLATING DEVICE FOR SCALES
Filed May 21, 1921
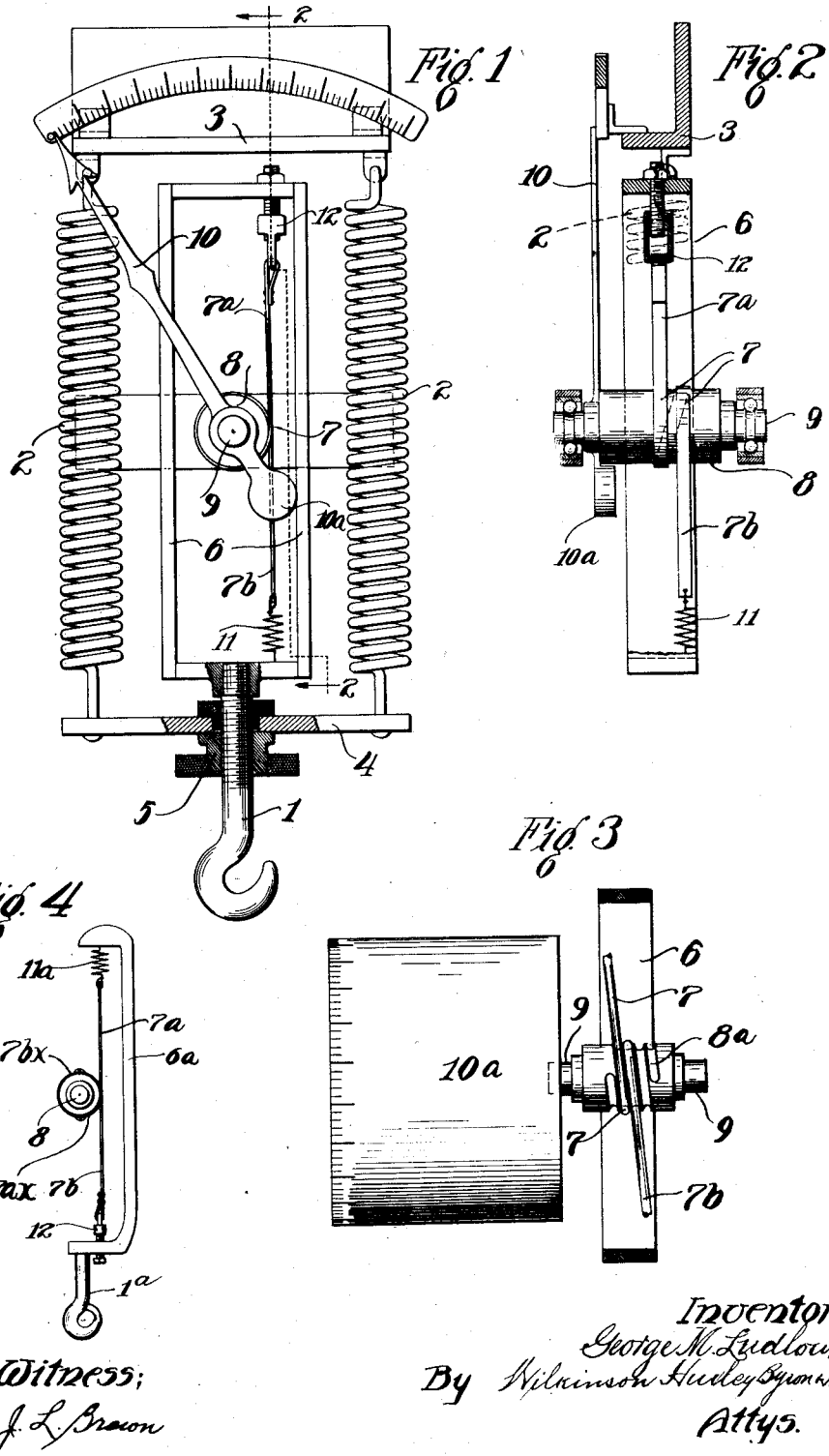
Witness;
J. L. Brown
Inventor
George M. Ludlow,
By Wilkinson Huxley Byron & Knight
Attys.

Patented Aug. 3, 1926.

1,594,536

UNITED STATES PATENT OFFICE.

GEORGE M. LUDLOW, OF CHICAGO, ILLINOIS, ASSIGNOR TO SANITARY SCALE COMPANY, OF CHICAGO, ILLINOIS, A CORPORATION OF ILLINOIS.

MOTION-TRANSLATING DEVICE FOR SCALES.

Application filed May 21, 1921. Serial No. 471,422.

This invention relates to weighing apparatus and particularly to that class of weighing apparatus in which movement of the loading member in one direction by the load to be weighed and in the other direction by counterbalancing means, is translated into a rotary motion of an indicator by the means of flexible connectors winding over pulley surfaces that are in driving connection with the indicator.

Heretofore, when reciprocating weighing motion has been translated into rotary indicating motion through means of this type, flexible connectors oppositely wound upon the pulley surfaces have generally been extended in the same direction from the axis of rotation of the indicator, and are connected, respectively, with a weighing member that rotated the indicator in the direction to produce the reading, and to a return spring that rotated the indicator back to zero; or said flexible connectors were connected to opposite ends of a pivoted lever, to one end of which the weighing member was connected.

The present invention provides a more compact arrangement and a simpler construction of more direct control between the weighing member and the indicator, and consists in arranging the flexible connectors or leads so that they extend in opposite directions from the plane of rotation of the pulley surfaces upon which they run, and in introducing between the weighing member and said connectors a frame which intersects said plane of rotation so that it extends on opposite sides thereof in position to receive the respective connectors and develop tension in them reciprocally in a manner to cause opposite longitudinal movements of the frame to be transmitted positively and directly through the flexible connectors to the pulley surfaces and the indicator.

In carrying out the invention, according to the preferred embodiment thereof, the reciprocating frame is connected with the weighing member through means that permits it to be adjusted longitudinally for zeroizing the indicator. The term "weighing member" is intended to allude to any part which is moved in one direction by the load to be weighed and in the other direction by the counterbalancing means. In the organization of the preferred embodiment herein disclosed, it constitutes a yoke to the ends of which a pair of counterbalancing springs are connected, and to an intermediate portion of which a loading member is secured, and this loading member also serves as a means for connecting the translating frame with the yoke and for developing the relative adjustment and zeroizing the indicator. The frame is thus connected to the loading and counterbalancing elements of the scale independently of the flexible winding leads. It is especially equipped for maintaining proper tension in the leads by stretching the leads from the pulley to the respective ends of the frame, and interposing a spring for maintaining such tension. Equality of rotating influence which the two leads exert upon the pulley through forces other than mere tension, for instance, resiliency in their flexure, permits the use of a resilient steel tape for the leads.

In the accompanying drawing, in which two embodiments of the invention are shown by way of illustration:

Figure 1 is a front elevation of a weighing mechanism embodying the subject-matter of the present invention, and in connection with which a revolving pointer is used as an indicator; the flexible resilient connector being in the form of a steel tape.

Figure 2 is a side elevation of the same.

Figure 3 is a view similar to Figure 1 in which the indicator is in the form of a revolving drum, and a steel wire is used instead of the steel tape of Figures 1 and 2; and Figure 4 shows another modified construction.

1 represents a portion of the loading members, 2 the counterbalancing springs depending from a top rail 3 to the yoke 4 through which they sustain the loading member 1 through the medium of the adjustable sleeve nut 5, and 6 represents the frame upon which is stretched the flexible connector 7 which passes around the pulley 8 on the indicator shaft 9. Frame 6 extends in opposite directions from an intersecting diameter of pulley 8 (in the illustrative embodiments) above and below the horizontal diameter thereof. It may have its vertical sides duplicated on opposite sides of the pulley, as in Figure 1, or one one side only as shown at 6' in Figure 4. The flexible connector 7 in Figures 1 and 2 is a flat steel tape, while in Figure 3 it is in the form of a steel wire. In both instances the connector is made without substantial longitudinal elasticity under any load that it will be called upon to transmit, but is preferably made with a very material coefficient of flexing elasticity so that it does not take upon itself any permanent set in coiling about the pulley 8, but rather tends to uncoil therefrom and free its oppositely departing tangential leads 7ª and 7ᵇ from the pulley, so that while effectively gripping the pulley and fixing the relation thereto of the frame 6, which constitutes an extension of the weighing or loading connector 1 and accurately translates reciprocating weighing movement into rotary indicating movement, it does so without material resistance. Transmission of movement from the flexible connector to the pulley is also without material resistance from the flexing of the leads, because of the resilient nature of the latter and consequent balancing of flexing resistance in one lead, as it winds, by reflex action of the other lead, as it unwinds.

The leads are preferably provided by a single flexible connector, in the form of a flat steel tape having its intermediate portion wound upon the pulley as shown in Figures 1 and 2, because of the improved driving effect upon the pulley 8 and higher coefficiency of flexibility; but the advantages of the invention may be realized to a beneficial degree by the use of the steel wire of Figure 3, particularly if the pulley 8ª be formed with a spiral groove proportioned to increase surface contact between the wire and the pulley.

While the invention is of special advantage in a scale in which the drum type of indicator 10ª is employed, as shown in Figure 3, where the indicator is balanced with great accuracy about its center of revolution, it is also of very great advantage in imparting rotary motion to a scale which employs an indicator arm, such as shown at 10 in Figures 1 and 2, and which also may be balanced by a counterweight 10ª if desired.

To maintain the proper tension in the flexible connector 7, a tensioning spring 11 is interposed between at least one end of the flexible connector and the frame 6, the other end being, if desired, provided with a fixed anchorage to the frame 6 in the form of a screw 12. It is also desirable to make one of the connections, for instance, the screw 12, adjustable in a manner to properly tension the tape. Obviously, adjustment imposed upon either lead of the flexible connector, whether by the spring 11 or anchoring screw 12, will be immediately reflected in the opposite lead so that both leads are under the same tension at all times and their resistance to winding and counteracting tendency to unwind will always be balanced.

By means of the sleeve nut 5 and its threaded connection with the loading member 1, the loading member may be adjusted vertically relatively to the position in which the springs 2 sustain the yoke 4, and thereby zeroize the indicator of the scale.

According to Figure 4, the frame is in the form of a bow 6ª; the leads 7ª and 7ᵇ connected thereto by spring 11ª and adjustable turnbuckle 12 are provided by separate pieces of flexible tape individually wound upon the pulley 8 and anchored thereto, respectively, at 7ᵃˣ and 7ᵇˣ; and the loading member 1ª is in the form of a closed eye-bar adapted to transmit thrust as well as pull to the frame, the counterbalancing members being understood to be connected in the weighing system at some other point. The loading member 1ª in this instance constitutes a weighing member inasmuch as it is moved positively in both directions.

An important feature of the invention in its broader aspect consists in having a rigid frame extending in opposite directions from an intersecting diameter of the rotary pulley to receive the two leads of the flexible connection which drive the pulley and impart rotation in opposite directions to the pulley by pull upon the respective leads without resistance to movement other than that imposed by the inertia or other resistance of the accurately balanced indicator.

Still another important feature of the invention consists in the fact that the pulley, which is thus positively driven in both directions by the frame, has a fixed axis of rotation.

Still another important feature of the invention resides in the fact that the counterbalancing member sustains the load imposed by the loading member upon the yoke, independently of the motion translating device, and, therefore, the comparatively delicate and accurately balanced indicating mechanism, including the pulley and the leads, is not required to sustain any of the stress imposed by either the loading or counterbalancing elements, but merely receives and translates the motion developed by said loading and counterbalancing elements in the frame. Moreover, the counterbalancing elements 2 can be calibrated without taking into account return springs or weights acting upon the rotary indicator.

I claim:

1. In a weighing scale, a rotary indicator, a reciprocating weighing member, and means for translating reciprocating weighing movements into opposite rotary indicator movements, comprising pulley and winding members, of which the pulley drives the indicator and the winding member has two leads connected, respectively, with the reciprocating member on opposite sides of the indicator's axis of revolution; the reciprocating member being rigid and the connection of said winding member with the reciprocating member being longitudinally adjustable so that while positively driving the pulley in both directions, the angular position of the pulley and indicator relatively to the reciprocating member can be changed at will for zeroizing the indicator.

2. In a weighing scale, a rotary indicator, a reciprocating weighing member, and means for translating reciprocating movements into opposite rotary indicator movements, comprising pulley and winding members, the former of which rotates the indicator and the latter has two leads extending oppositely from the pulley and connected with the reciprocating member on opposite sides of the axis of rotation; the reciprocating member being rigid and the connection of one of said leads with the reciprocating member being through the medium of a spring, and the connection of the other thereof being longitudinally adjustable at will.

Signed at Chicago, Illinois, this 19th day of May, 1921.

GEORGE M. LUDLOW.